(12) United States Patent
Pais et al.

(10) Patent No.: US 12,500,045 B2
(45) Date of Patent: Dec. 16, 2025

(54) CAPACITOR AND METHOD OF ITS MANUFACTURING BASED ON OXIDATIVE POLYMERIZATION DISPERSION

(71) Applicant: KEMET Electronics Corporation, Fort Lauderdale, FL (US)

(72) Inventors: Vania Pais, Évora (PT); Joao Parada, Évora (PT); Débora Sá, Évora (PT); Felipe Schmidt, Évora (PT); Rui A. Monteiro, Évora (PT); Victor Andoralov, Gränna (SE)

(73) Assignee: KEMET Electronics Corporation, Fort Lauderdale, FL (US)

( * ) Notice: Subject to any disclaimer, the term of this patent is extended or adjusted under 35 U.S.C. 154(b) by 190 days.

(21) Appl. No.: 18/216,110

(22) Filed: Jun. 29, 2023

(65) Prior Publication Data
US 2024/0029964 A1    Jan. 25, 2024

Related U.S. Application Data

(60) Provisional application No. 63/389,509, filed on Jul. 15, 2022.

(51) Int. Cl.
| | |
|---|---|
| *H01G 11/84* | (2013.01) |
| *C08G 61/12* | (2006.01) |
| *C09D 5/24* | (2006.01) |
| *C09D 7/20* | (2018.01) |
| *C09D 7/45* | (2018.01) |

(Continued)

(52) U.S. Cl.
CPC .......... *H01G 11/84* (2013.01); *C08G 61/126* (2013.01); *C09D 5/24* (2013.01); *C09D 7/20* (2018.01);

(Continued)

(58) Field of Classification Search
CPC ...................................................... C09D 7/20
See application file for complete search history.

(56) References Cited

U.S. PATENT DOCUMENTS

| | | |
|---|---|---|
| 5,798,905 A | 8/1998 | Nishiyama et al. |
| 6,024,772 A | 2/2000 | Nishiyama et al. |

(Continued)

FOREIGN PATENT DOCUMENTS

| | | |
|---|---|---|
| WO | WO 2020/018216 A1 | 1/2020 |
| WO | WO 2022/060460 A1 | 3/2022 |

OTHER PUBLICATIONS

Markoulidis et al. "Electrochemical double-layer capacitors with lithium-ion electrolyte and electrode coatings with PEDOT:PSS binder" Journal of Applied Electrochemistry '21.

(Continued)

*Primary Examiner* — William D Young
(74) *Attorney, Agent, or Firm* — Joseph T. Guy; Patent Filing Specialist Inc.

(57) ABSTRACT

An improved dispersion, which is particularly suitable for use in forming a hybrid capacitor, and improved method for forming a hybrid capacitor, and an improved capacitor is provided. The method comprises forming a dispersion comprising a conductive polymer, a dispersing agent, a monomer of the conductive polymer and a molar excess of anionic counterion per mole of conductive polymer and monomer. The dispersion is homogenized to form a homogenized dispersion. A capacitor is formed comprising a conductive layer formed from the homogenized dispersion.

15 Claims, 5 Drawing Sheets

(51) Int. Cl.
  *C09D 7/63* (2018.01)
  *C09D 165/00* (2006.01)
  *H01G 11/60* (2013.01)
  *H01G 11/62* (2013.01)
  *H01G 11/80* (2013.01)

(52) U.S. Cl.
  CPC ............... *C09D 7/45* (2018.01); *C09D 7/63* (2018.01); *C09D 165/00* (2013.01); *H01G 11/60* (2013.01); *H01G 11/62* (2013.01); *H01G 11/80* (2013.01); *C08G 2261/122* (2013.01); *C08G 2261/1452* (2013.01); *C08G 2261/148* (2013.01); *C08G 2261/334* (2013.01); *C08G 2261/514* (2013.01)

(56) References Cited

U.S. PATENT DOCUMENTS

| | | | |
|---|---|---|---|
| 8,927,683 B2 | 1/2015 | Atobe et al. | |
| 9,183,990 B2 | 11/2015 | Nobuta et al. | |
| 9,373,448 B2 | 6/2016 | Majima et al. | |
| 9,455,092 B2 | 9/2016 | Sugawara et al. | |
| 9,514,889 B2 | 12/2016 | Asteman et al. | |
| 10,297,862 B2 | 5/2019 | Wright et al. | |
| 10,336,859 B2 | 7/2019 | Sugihara et al. | |
| 10,826,119 B2 | 11/2020 | Wright et al. | |
| 10,832,873 B2 | 11/2020 | Andrew et al. | |
| 2012/0063063 A1 | 3/2012 | Qiu et al. | |
| 2015/0029641 A1 | 1/2015 | Han et al. | |
| 2015/0255221 A1* | 9/2015 | Asteman | H01G 9/012 252/500 |
| 2021/0005396 A1* | 1/2021 | Bunha | H01B 1/127 |
| 2022/0059296 A1 | 2/2022 | Andoralov et al. | |
| 2022/0084756 A1 | 3/2022 | Fujui | |

OTHER PUBLICATIONS

ISA/US; International Search Report and Written Opinion; PCT/US2023/026562; Date mailed: Jan. 9, 2024.

* cited by examiner

CAPACITOR AND METHOD OF ITS MANUFACTURING BASED ON OXIDATIVE POLYMERIZATION DISPERSION

CROSS-REFERENCE TO RELATED APPLICATIONS

The application claims priority to pending U.S. Provisional Application No. 63/389,509 filed Jul. 15, 2022 which is incorporated herein by reference.

FIELD OF THE INVENTION

The present invention is related to improved capacitors and particularly hybrid capacitors. More specifically, the present invention is related to improved methods for forming hybrid capacitors comprising conductive polymer dispersions.

BACKGROUND

Conducting polymers are widely used in electrolytic capacitors. The most promising systems are suitable for use in high temperature environments and at high voltage. The solid conducting polymers can be combined with liquid electrolytes, referred to as a hybrid capacitor, to insure low leakage current and high reliability during the operational life.

A significant advance in the art has been realized by the use of conductive polymer dispersions in a hybrid capacitor. An exemplary system is PEDOT/PSSA. In this exemplary system 3,4-ethylenedioxythiophene (EDOT) is polymerized in a positively charged conducting polymer chain to form poly(3,4-ethylenedioxythiophene) (PEDOT). Poly(4-styrenesulfonic acid) (PSSA) is used as a dopant and anionic counter ion. To get nano particles of the polymer stable in a dispersing agent, such as water, an excessive amount of PSSA, per mole, is used to achieve a negative Z-potential on the surface of the particles. There are disadvantages of the PSSA in terms of conductivity of the final polymer film since the PSSA can inhibit the PEDOT from reaching the cores in the film. However, PSSA can be dissolved in hybrid capacitors where the conducting system is represented by a solid and a liquid electrolyte at the same time. PSSA in solution is aggressive for some electrolytic capacitors such as aluminium capacitors. The acid can lead to leakage current increase, corrosion of the metal and capacitor failure especially in high humidity environment.

There has been an ongoing need for improvements in hybrid capacitors, specifically, with regards to stability. Provided herein is an improved hybrid capacitor and a method of forming the improved hybrid capacitor.

SUMMARY OF THE INVENTION

It is an object of the invention to provide an improved hybrid capacitor and method for forming an improved hybrid capacitor.

It is another object of the invention to provide a hybrid capacitor comprising a conductive polymeric cathode wherein the conductive polymeric cathode has near neutral or positive surface charge.

A particular feature of the invention is improved capacitor properties, particularly capacitance stability and lower ESR.

These and other advantages, as will be realized, are provided in a method for forming a hybrid capacitor comprising:

forming a dispersion comprising a conductive polymer, a dispersing agent, a monomer of the conductive polymer and a molar excess of anionic counterion per mole of conductive polymer and monomer;
homogenizing the dispersion to form a homogenized dispersion;
forming a capacitor comprising a conductive layer formed from the homogenized dispersion.

Yet another embodiment is provided in a method for forming a hybrid capacitor comprising:

forming a dispersion comprising a conductive polymer, a dispersing agent, a monomer of the conductive polymer and a molar excess of anionic counterion per mole of conductive polymer and monomer;
homogenizing the dispersion to form a homogenized dispersion;
applying the homogenized dispersion to form a layer of homogenized dispersion on an oxide layer of a metal;
removing the dispersing agent of the layer;
curing the monomer to form a coated film;
forming a layered structure comprising the coated film a conductive layer and a separator there between;
rolling the layered structure to form a working element;
inserting the working element into a housing;
adding a liquid electrolyte to the housing; and sealing the housing.

Yet another embodiment is provided in a hybrid capacitor. The hybrid capacitor comprises a sealed housing comprising therein an anode with a dielectric on the anode, a conductive polymer layer on the dielectric. The conductive polymer layer has a surface layer concentration of sulfur of at least 1 wt %. A separator and liquid electrolyte are between the cathode and anode.

Yet another embodiment is provided in a dispersion comprising a conductive polymer, a dispersing agent, a monomer of the conductive polymer and a molar excess of anionic counterion per mole of conductive polymer and monomer.

DESCRIPTION

The present invention is related to an improved hybrid capacitor and improved method for manufacturing a hybrid capacitor. More specifically, the present invention is related to the formation of a polymer dispersion comprising prepolymerized polymer, with an excess of anionic counter ion, and dispersed monomerin a dispersing agent. The polymer dispersion is then used to form a solid cathode layer in a hybrid capacitor comprising a liquid electrolyte. The resulting capacitor has improved properties, especially improvements in equivalent series resistance (ESR) and capacitance stability.

Figure 1:
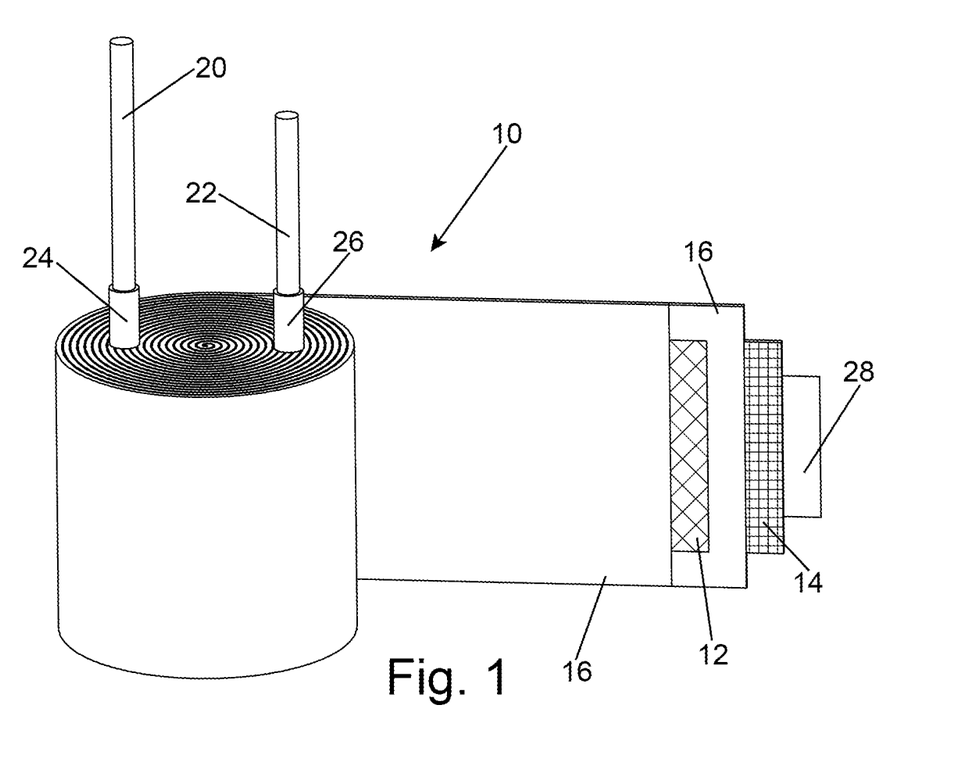
FIG. 1 is schematic representation of an embodiment of the invention.

An embodiment of the invention will be described with reference to FIG. 1 wherein a working element is shown in schematic partially unwound view prior to insertion into a container and optionally, but preferably, impregnation with liquid electrolyte. In FIG. 1, the working element, generally represented at 10, comprises an anode, 12, and cathode, 14, with a separator, 16, which may be a conductive separator, there between. It is understood to those of skill in the art that the anode has a dielectric thereon. A conductive separator has a conductive polymer either coated on the separator or the separator is impregnated, and preferably saturated, with conductive polymer. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

Figure 2:
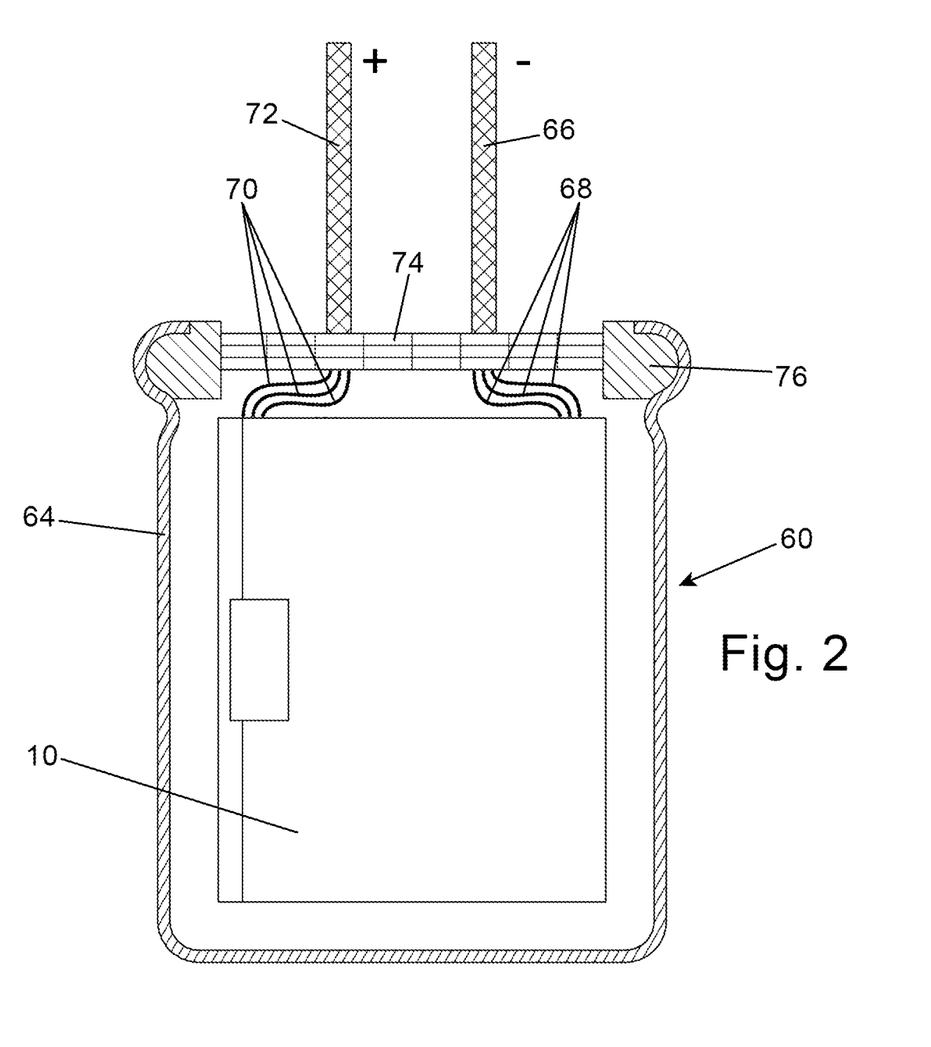
FIG. 2 is a schematic representation of an embodiment of the invention.

A capacitor is illustrated in cross-sectional schematic view in FIG. 2. In FIG. 2, the capacitor, generally represented at 60, comprises a working element, 10, as described herein, within a housing, 64. The housing, which may be referred to as a can in the art, is preferably conductive and may function as a lead or be in electrical contact with a cathode lead, 66. Cathode tabs, 68, are in electrical contact with the housing or cathode lead. Anode tabs, 70, are in electrical contact with an anode lead, 72. A lid, 74, and seal, 76, such as a gasket, seals the housing to inhibit atmospheric exchange between the interior of the housing and ambient atmosphere. In one embodiment the seal is a hermetic seal.

The instant invention is specific to improvements in the conductive polymer layer and, more specifically, the conductive polymer layer on at least one of the dielectric of the anode, the cathode or the separator forming a solid electrolyte.

Figure 3:
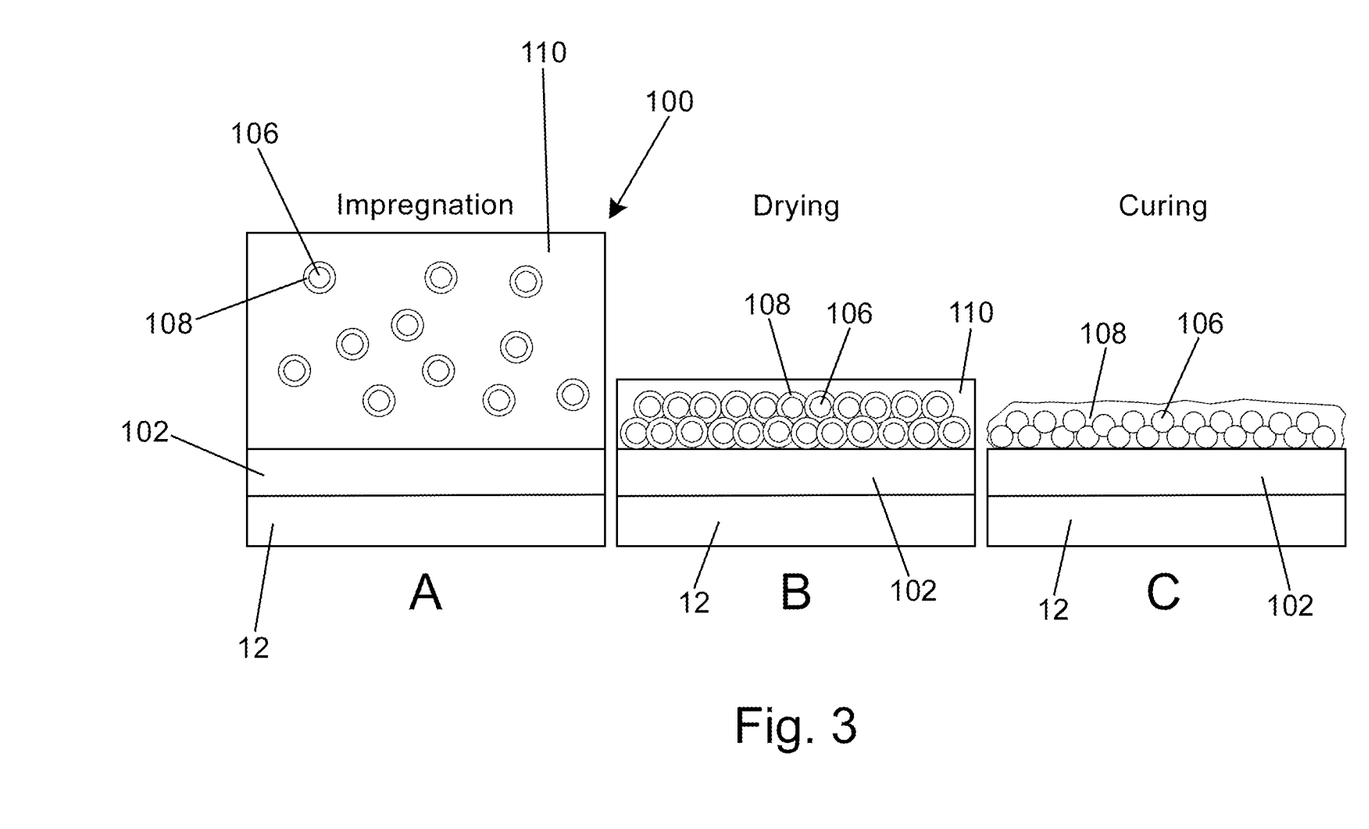
FIG. 3 is a schematic representation of convention methods for forming a capacitor.

An embodiment of the invention will be described with reference to FIGS. 3 and 4 wherein a comparison of the convention process for forming a capacitor and inventive process is illustrated schematically. FIG. 3 represents the conventional process presented for clarification of the invention and FIG. 4 represents the inventive process.

In FIG. 3 a preformed polymer dispersion, 100, is applied to a dielectric, 102, such as on an anode, 12, as illustrated schematically in A. The preformed polymer dispersion comprises conductive polymer 106, and anionic counterion, 108, in the forms of particles. While not limited to theory, it is hypothesized that the conductive polymer and anionic counterion form core-shell particles with the conductive polymer phase at least partially encased in the anionic counterion. The particles are suspended in a dispersing agent, 110, such as water. The dispersing agent is removed, such as by drying, resulting in coalesced particles dispersed on the surface of the dielectric as illustrated schematically in B. When cured the conductive polymer phase, and anionic counterion phase, are hypothesized to coalesce thereby forming a conductive polymer coating with a negative surface due to the at least partial encapsulation of the conductive polymer by the anionic counterion phase as illustrated schematically in C.

Figure 4:
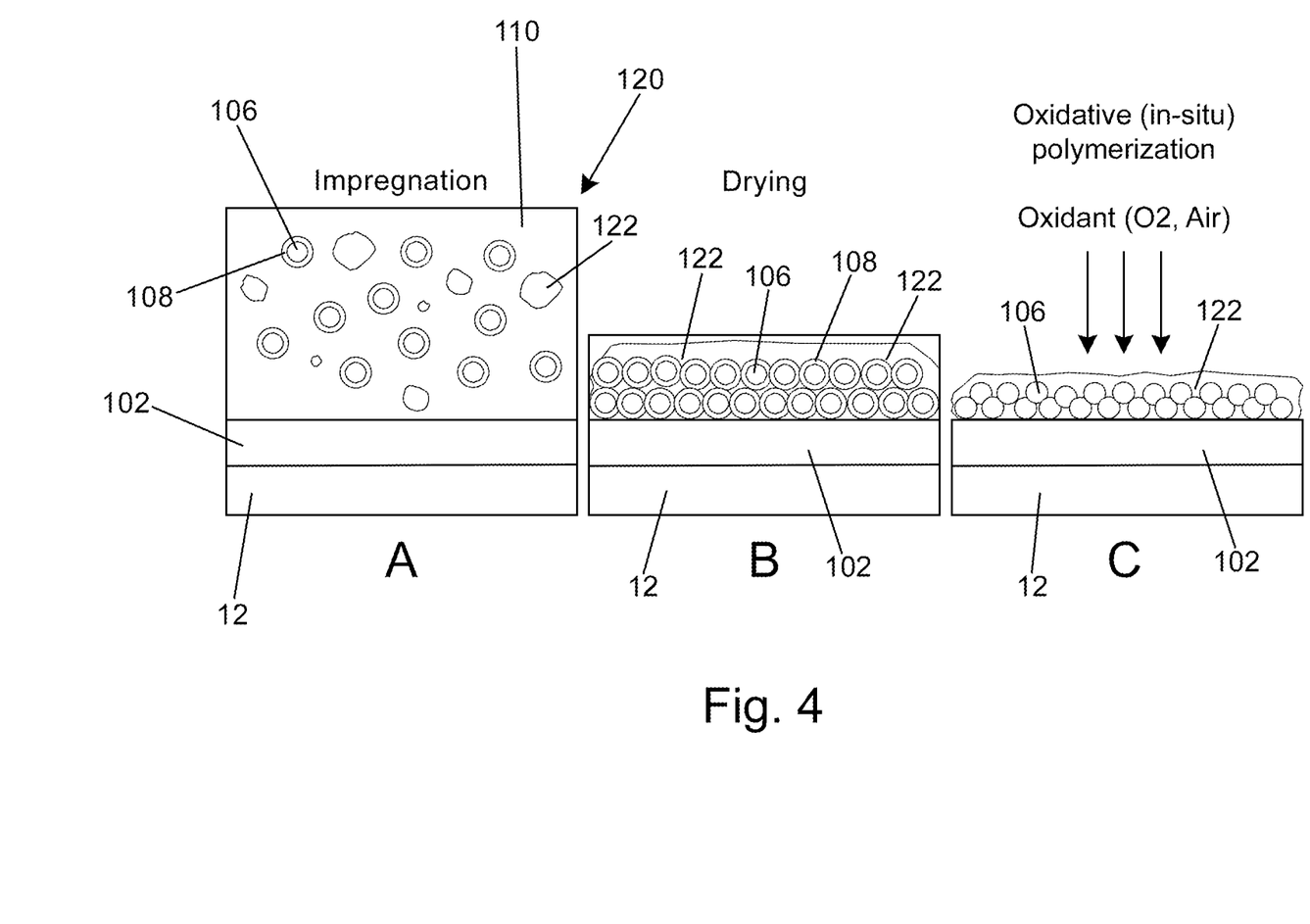
FIG. 4 is a schematic representation of an embodiment of the invention.

In FIG. 4, the inventive dispersion, 120, comprises preformed polymer dispersion comprising conductive polymer, 106, and anionic counterion, 108, in the forms of particles as discussed relative to FIG. 3. The inventive dispersion further comprises monomer, 122, which is not particularly soluble in the dispersing agent, 110, and therefore it is preferable to include a surfactant to stabilize the monomer thereby forming a dispersed monomer wherein the dispersed monomer is hypothesized to be in the form of particles, 122, as illustrated schematically in A. The conductive polymer, dispersed monomer anionic counterion and optional surfactants are homogenized resulting in a homogenized dispersion. As the dispersing agent is removed, such as by drying, the dispersed monomer is hypothesized to at least partially encase the particles of conductive polymer and anionic counterion as illustrated schematically in B. The monomer polymerizes during removal of dispersion agent, preferably by oxidation from oxygen due to exposure to air as illustrated schematically in C. Instead of a predominantly positive charged core with a predominantly negatively charged shell, as illustrated schematically in FIG. 3, the result is a conductive polymer layer with anionic counterion dispersed more homogenously throughout the conductive polymer layer resulting in a neutralized, or positively charged surface, thereby decreasing the negative potential of the surface resulting in a lowering of resistivity of the surface layer as illustrated schematically in FIG. 4. Evidence for the structure is provided in Scanning Electron Microscopy coupled with Energy Dispersive X-Ray Spectroscopy (SEM EDS) and conductivity studies. SEM EDS of surfaces formed from convention dispersions, as illustrated schematically in FIG. 3, have a lower surface layer concentration of sulfur wherein the sulfur content is less than 0.75 wt % whereas the inventive sample have higher surface layer concentration of sulfur of at least 1 wt %, more preferably at least 1.2 wt % and even more preferably at least 1.4 wt %. A zetapotential analysis of the solution supported the structure wherein the analysis. The zetapotential for the comparative solution was about −67.7 mV whereas the inventive solution had a zetapotential of −56.6 mV indicating the inventive sample more positively charged supporting the conclusion of more polymer on the surface than anionic counterion.

As illustrated schematically in FIG. 4, the inventive slurry provides a compact polymer film surface wherein the conductive polymer is in contact with the liquid electrolyte. When a convention slurry is utilized the surface of the conductive polymer layer comprises the anionic counterion which is a non-conducting material. The non-conducting layer on the surface functions as an insulation layer with the highly conducting layer interior thereto. The more compact conducting polymer film having a minimized amount of non-conducting components on the surface has significantly higher conductivity resulting in better electrical characteristics of the capacitor. The advantages of the inventive process include an inventive capacitor with a lower ESR and better stability.

While not limited to theory, it is hypothesized that during oxidative polymerization the excessive amount of the anionic counterion, as referred to as dopant, is bonded with the newly formed conductive polymer, from the dispersed monomer, thereby inhibiting dissolution of the anionic counterion in liquid electrolyte of the finished capacitor. This is a significant improvement in hybrid capacitor technology since dissolved anionic counterion is an aggressive agent capable of degrading some capacitor components. Oxidative polymerization of the dispersed monomer allows much better polymer/substrate binding thereby preventing delamination of the polymer film resulting in improved stability with regards to the capacitance of the capacitor.

The present invention provides a method of formation of the conductive polymer, and capacitor, which mitigates the detrimental impact of excessive amounts of PSSA on the capacitor performance. In the present invention the polymer dispersion is prepared in a monomer emulsion. More specifically, pre-polymerized solid nanoparticles are co-dispersed in a dispersing agent, preferably water, with monomer wherein the monomer is in the form of micrometer or nanometer sized drops. In this case the main dispersing agent liquid is not mixable with the monomer liquid, and the oxidative polymerization is preferably suppressed through elimination of oxidizers presence in the slurry. The monomer drops are preferably stabilized with a surfactant.

For the purposes of the present invention an excess of anionic counterion, represented by PSSA, exceeds that necessary to balance the charge of the conductive polymer, represented as PEDOT, and monomer, represented as EDOT. As would be understood after oxidative polymerization the monomer is polymer or, with the representative monomer and polymer the EDOT becomes PEDOT. It is preferable that the weight ratio of PEDOT and EDOT/PSSA in the dispersion be at least 1:1.5-1:5; and more preferable about 1:2-1:3. It is preferable that the ratio of PEDOT/PSSA in the capacitor be at least 1:1.5-1:5; and more preferable about 1:2-1:3. The molar ratio of PEDOT/PSSA in the dispersion is preferably at least 1:1.16-1:3.9, more preferably at least 1:1.5-1:2.3. The molar ratio of PEDOT/PSSA in the capacitor is preferably at least 1:1.16-1:3.9, more preferably at least 1:1.5-1:2.3.

The anode is preferably a metal and more preferably a valve metal selected from the group consisting of tantalum, aluminum, niobium, titanium, zirconium, hafnium, alloys of these elements, and a conductive oxide thereof such as NbO. Aluminum is a particularly preferred anode material.

The dielectric is not particularly limited herein. An oxide of the anode material is a particularly suitable dielectric, without limit thereto, due to the well-established use thereof in the art and manufacturing convenience.

The preferred monomer is defined as Formula A with n=1 and no bonds between adjacent units and the preferred polythiophene is shown as Formula A:

Formula A wherein:
$R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—$(CH_2)_2$—O— is most preferred. In Formula 1, X is preferably selected from the group consisting of S, N or O and most preferable X is S. Subscript n of the monomer is 1 and for the polymer it is a number from 2 to a number sufficient to achieve a molecular weight of up to 100,000 g/mole. A particularly preferred conductive polymer is polymerized 3,4-polyethylene dioxythiophene (PEDOT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or $OR^3$; or $R^1$ and $R^2$, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. $R^3$ preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-,m-,p-nitrobenzoic acid, o-,m-,p-nitrobenzene alcohol. A particularly preferred hybrid capacitor comprises up to 50 wt % liquid electrolyte.

Particularly preferred anionic counterions, or dopant, are polystyrene sulfonic acids and derivatives thereof optionally in the form of a random copolymer comprising groups A, B and C represented by the ratio of Formula B:

$A_xB_yC_z$      Formula B wherein:
A is polystyrenesulfonic acid or salt of polystyrenesulfonate;
B and C separately represent polymerized units substituted with a group selected from:
-carboxyl groups;
—$C(O)OR^6$ wherein $R^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—$(CHR^7CH_2O)_b$—$R^8$ wherein:
$R^7$ is selected from a hydrogen or an alkyl of 1 to 7 carbons and preferably hydrogen or methyl;
b is an integer from 1 to the number sufficient to provide a molecular weight of up to 200,000 for the —$CHR^7CH_2O$— group; and
$R^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—$C(O)$—$NHR^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—$C_6H_4$—$R^{10}$ wherein:

$R^{10}$ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —$(O(CHR^{11}CH_2O)_d$—$R^{12}$ wherein:

$R^{11}$ is a hydrogen or an alkyl of 1 to 7 carbons and preferably hydrogen or methyl; d is an integer from 1 to the number sufficient to provide a molecular weight of up to 200,000 for the —$CHR^{11}CH_2O$— group;

$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—$C_6H_4$—O—$R^{13}$ wherein:

$R^{13}$ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —$(CHR^{14}CH_2O)_e$—$R^{15}$ wherein:

$R^{14}$ is a hydrogen or an alkyl of 1 to 7 carbons and more preferably hydrogen of methyl; e is an integer from 1 to the number sufficient to provide a molecular weight of up to 200,000 for the —$CHR^{14}CH_2O$— group; and $R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

in one embodiment y and z are 0; and in another embodiment x, y and z, taken together are sufficient to form a polyanion with a molecular weight of at least 100 to no more than 500,000 and y/x is 0.01 to 100; z is 0 to a ratio z/x of no more than 100; more preferably x represents 50-99%, y represents 1 to 50% and z represents 0 to 49% of the sum total of x+y+z; even more preferably x represents 70-90%; y represents 10 to 30% and z represents 0 to 20% of the sum total of x+y+z. A particularly preferred anionic counterion is polystyrene sulfonic acid (PSSA).

Example 1

Axial hybrid capacitors of 63V working voltage and 400 uF capacitance were prepared comprising an aluminium anode with a pre-formed dielectric layer, an aluminium cathode, PEDOT/PSSA as the conductive polymer and an electrolyte comprising gamma butyrolactone (GBL), sulfolane, quaternary alkylammonium phthalate and polyethylene glycol and with nitro compounds as a stabilizer. The polymer is characterized with weight ratio of 1:3 for PEDOT/PSSA then molar ratio for monomers EDOT/PSSA is approx. 1:2.5.

Inventive capacitor group was prepared using the same conducting polymer dispersion with 1% EDOT emulsion.

The capacitors were tested at 63 V and 150° C.

After 250 h of the test capacitor teardown has been carried out for both capacitor types. The comparative capacitor was observed to have significant breakdown of the conductive polymer which was not observed in the inventive examples. Breakdown was indicated by the presence of a dark brown residue in the tab region where the tab was connected to the anode lead. The residue confirmed corrosion of the metal. The residue was determined to be sulfone groups by fourier transform infrared (FTIR) analysis.

The surfactant for dispersing the monomer in the inventive dispersion is preferably selected from the group selected consisting of non-ionic surfactants, fluorosurfactants, anionic surfactants, cationic surfactants and acetylenics. Particularly preferred surfactants include Triton X, Capstone® FS, Zonyl FS-300, sodium dodecyl sulfonate (SDS), Tetraoctylammonium bromide (TOAB), Surfynol® 104, Surfynol® 420, Dynol™ 607 and Dynol™ 604.

Example 1 demonstrates that the control polymer is aggressive for the hybrid capacitor and can lead to corrosion of the metal in the capacitor. With the inventive polymer enhanced compatibility of the materials achieved. Such a significant improvement is due to oxidative polymerization of EDOT which is happening during the modification. The curing is conducted at temperatures higher than 100° C. and about 150° C. and this temperatures EDOT gets polymerized by air in the layer binding exceed amount of PSSA from the solid polymer.

Example 2

V-chip hybrid capacitors of 63V and 100 uF were prepared comprising an aluminium anode with pre-formed dielectric layer, an aluminium cathode, PEDOT/PSS as the conductive polymer and an electrolyte comprising gamma butyrolactone (GBL), sulfolane, quaternary alkylammonium phthalate and polyethylene glycol and with nitro compounds as a stabilizer. The polymer is characterized with weight ratio of 1:3 for PEDOT/PSSA.

Inventive capacitors were prepared using the same conducting polymer dispersion in 1% EDOT emulsion.

Endurance test was carried out for the capacitors at 135° C. and 63V (DC).

Figure 5:
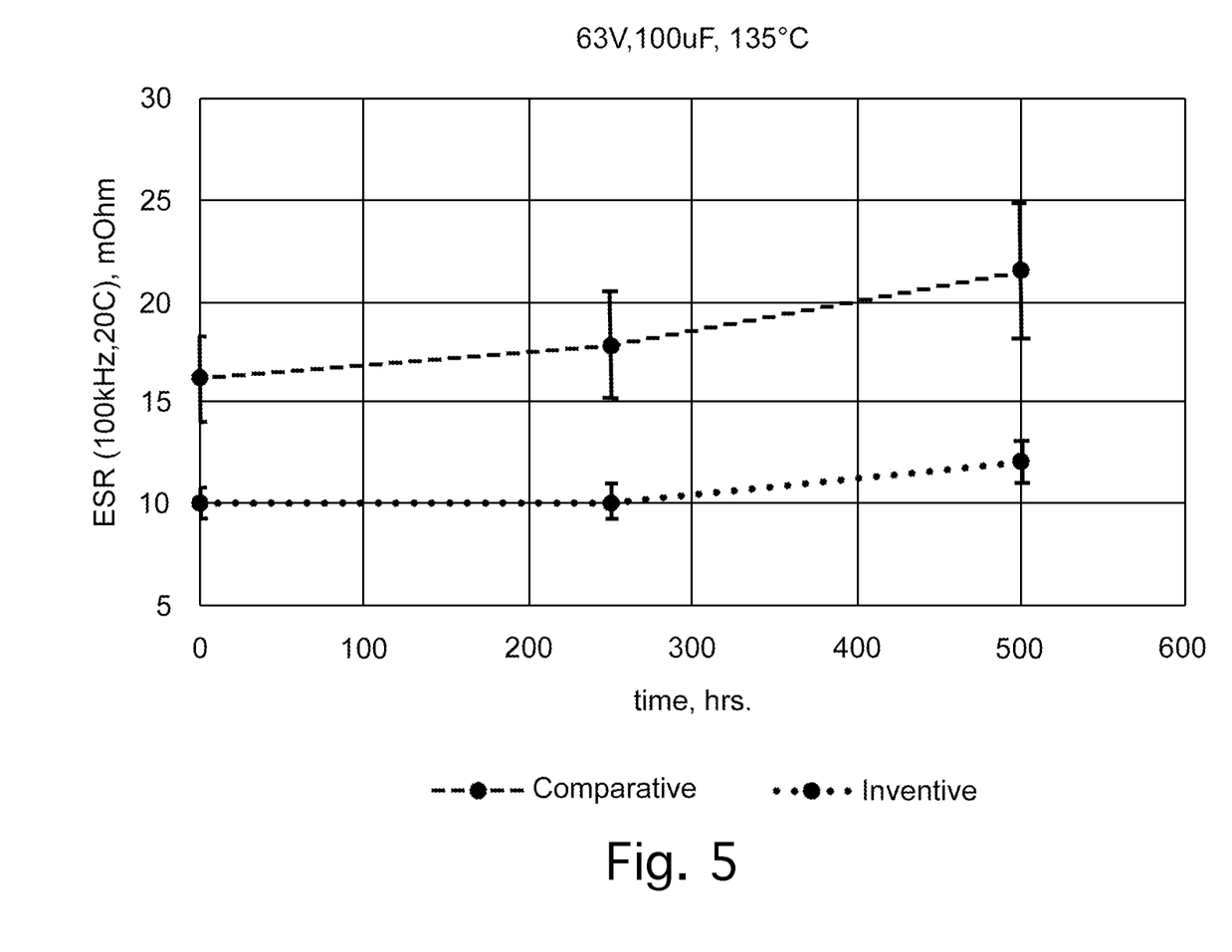
FIG. 5 is a graphical representation of an embodiment of the invention.

The results showed significant difference in initial ESR values and ESR stability over test time. The results are presented graphically in FIG. 5 wherein the ESR as a function of time is presented.

Example 3

A representative inventive slurry, comprising PEDOT/PSSA/EDOT, was evaluated for conductivity versus a representative comparative slurry comprising PEDOT/PSSA. The results are summarized in Table 1 and Table 2.

For preparation of the samples, the EDOT was added slowly to the PEDOT/PSS (1:3) in a Silverson L5MA homogenizer. After addition the rotation rate was increased to 900 rpm, for 15-20 min.

Experimental results showed that the conductivity of the final polymer film formed from the inventive slurry in the air; measured on a glass slide with 1 g of the slurry dried for 15 min at 90° C.; and 15 min at 150° C.; has significantly higher conductivity than the comparative slurry as shown in Table 2. The inventive example shows acceptable stability in pH, conductivity and viscosity with no significant change after 10 days of storage.

TABLE 1

Viscosity and pH of PEDOT/PSS(1:3) + EDOT slurries (1%, 5% and 10%) before and after 10 days of storage (room temperature, closed vessel no special gas treatment)

| Time | | PEDOT/PSS (1:3) | PEDOT/PSS (1:3) + 1% EDOT | PEDOT/PSS (1:3) + 5% EDOT | PEDOT/PSS (1:3) + 10% EDOT |
|---|---|---|---|---|---|
| Day 0 | pH | 3.6 | 3.8 | 3.9 | 3.7 |
| | Viscosity | 25 | 50 | 58 | 60 |
| Day 10 | pH | 3.6 | 3.7 | 3.8 | 3.8 |
| | Viscosity | 26 | 40 | 44 | 72 |

TABLE 2

Parameters measured for PEDOT/PSS (1:3) + EDOT variations vs. regular slurry

| Time | | PEDOT/PSS (1:3) | PEDOT/PSS (1:3) + 1% EDOT | PEDOT/PSS (1:3) + 5% EDOT | PEDOT/PSS (1:3) + 10% EDOT |
|---|---|---|---|---|---|
| Day 0 | Conductivity, S/cm | 13.8 | 31.6 | 22.9 | 20.9 |
| Day 10 | Conductivity, S/cm | 13.9 | 26.8 | 33.6 | 40.4 |

The invention has been described with reference to the preferred embodiments without limit thereto. One of skill in the art would realize additional embodiments and improvements which are not specifically stated but which are within the meets and bounds of the claims appended hereto.

The invention claimed is:

1. A dispersion comprising a conductive polymer, a dispersing agent, a monomer of said conductive polymer and a molar excess of anionic counterion per mole of said conductive polymer and monomer wherein said dispersion is homogenized.

2. The dispersion of claim 1 wherein said conductive polymer and monomer and said anionic counterion in said dispersion are in a weight ratio of 1:1.5 to 1:5.

3. The dispersion of claim 2 wherein said conductive polymer and monomer and said anionic counterion in said dispersion are in a weight ratio of 1:2 to 1:3.

4. The dispersion of claim 1 wherein said conductive polymer and said anionic counterion are in a weight ratio of 1:1.5 to 1:5.

5. The dispersion of claim 4 wherein said conductive polymer and said anionic counterion are in a weight ratio of 1:2 to 1:3.

6. The dispersion of claim 1 wherein said monomer is defined by Formula A with n=1 and no bonds between adjacent units and the conductive polymer is defined by Formula A:

Formula A wherein:
X is selected from the group consisting of S, N or O;
R$^1$ and R$^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR$^3$; or R$^1$ and R$^2$, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements, R$^3$ preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

7. The dispersion of claim 6 wherein X is S.

8. The dispersion of claim 6 wherein said conductive polymer is 3,4-polyethylene dioxythiophene.

9. The dispersion of claim 6 wherein said monomer is 3,4-ethylene dioxythiophene.

10. The dispersion of claim 1 wherein said anionic counterion is defined by:

$$A_x B_y C_z$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—C₆H₄—R¹⁰ wherein:

R¹⁰ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —(O(CHR¹¹CH₂O)$_d$—R¹² wherein:

R¹¹ is a hydrogen or an alkyl of 1 to 7 carbons and preferably hydrogen or methyl;

d is an integer from 1 to the number sufficient to provide a molecular weight of up to 200,000 for the —CHR¹¹CH₂O— group;

R¹² is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—C₆H₄—O—R¹³ wherein:

R¹³ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —(CHR¹⁴CH₂O)$_e$—R¹⁵ wherein:

R¹⁴ is a hydrogen or an alkyl of 1 to 7 carbons;

e is an integer from 1 to the number sufficient to provide a molecular weight of up to 200,000 for the —CHR¹⁴CH₂O— group; and R¹⁵ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

and x, y and z are sufficient to form a polyanion with a molecular weight of at least 100 to no more than 500,000 wherein y/x is 0.01 to 100; z is 0 to a ratio z/x of no more than 100.

11. The dispersion of claim 10 wherein x represents 50-99%, y represents 1 to 50% and z represents 0 to 49% of the sum total of x+y+z.

12. The dispersion of claim 11 wherein x represents 70-90%; y represents 10 to 30% and z represents 0 to 20% of the sum total of x+y+z.

13. The dispersion of claim 1 wherein said anionic counterion is polystyrene sulfonic acid.

14. The dispersion of claim 1 wherein said homogenized dispersion further comprises a surfactant.

15. The dispersion of claim 14 wherein said surfactant is selected from the group consisting of non-ionic surfactants, fluorosurfactants, anionic surfactants, cationic surfactants and acetylenics.

* * * * *